United States Patent
Haug et al.

(10) Patent No.: US 6,840,370 B2
(45) Date of Patent: Jan. 11, 2005

(54) DRIVE UNIT FOR CONTINUOUS MEANS OF CONVEYANCE IN A CONTINUOUS TRANSFER SYSTEM

(75) Inventors: Heinz Haug, Schwieberdingen (DE); Ralph Schneider, Waiblingen (DE); Claus Scholpp, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/380,253
(22) PCT Filed: Sep. 4, 2001
(86) PCT No.: PCT/DE01/03376
§ 371 (c)(1), (2), (4) Date: Mar. 12, 2003
(87) PCT Pub. No.: WO02/22472
PCT Pub. Date: Mar. 21, 2002

(65) Prior Publication Data
US 2003/0183487 A1 Oct. 2, 2003

(30) Foreign Application Priority Data
Sep. 15, 2000 (DE) .......................... 100 45 739

(51) Int. Cl.[7] .............................................. B65G 23/06
(52) U.S. Cl. ........................ 198/837; 198/834; 198/832
(58) Field of Search ................................ 198/832, 837, 198/833, 834, 835

(56) References Cited

U.S. PATENT DOCUMENTS

| | | | |
|---|---|---|---|
| 4,344,527 A | * 8/1982 | Vogt et al. | 198/781.04 |
| 4,437,564 A | 3/1984 | Linke et al. | |
| 5,105,936 A | 4/1992 | Stapper | |
| 5,375,696 A | * 12/1994 | Collins et al. | 198/781.04 |
| 6,170,645 B1 | * 1/2001 | Mitchell | 198/816 |
| 6,227,354 B1 | * 5/2001 | Howden et al. | 198/834 |
| 6,279,733 B2 | * 8/2001 | Eltvedt | 198/816 |
| 6,530,432 B2 | * 3/2003 | Gipson | 166/384 |
| 6,607,074 B2 | * 8/2003 | Klabisch et al. | 198/834 |

FOREIGN PATENT DOCUMENTS

| | | |
|---|---|---|
| DE | 17 56 355 A | 4/1970 |
| DE | 195 32 391 A1 | 3/1997 |
| DE | 295 21 586 U | 1/1998 |
| DE | 299 15 798 U | 3/2000 |

* cited by examiner

*Primary Examiner*—D. A. Hess
(74) *Attorney, Agent, or Firm*—Michael J. Striker

(57) ABSTRACT

A drive unit (10) for a continuous conveyance means of a transfer system has a housing part (16) comprising two side walls (17, 18), in each of which a recess (25) is formed. A bearing plate (31) is capable of being inserted into each of the recesses (25) from the top end face of the housing part (16). The drive shaft (37) of a drive wheel (38) for the conveyance mechanism is supported in the bearing plates (31). The design of the drive unit (10) according to the invention allows for universal use of the drive unit (10) combined with easy assembly of its individual parts.

7 Claims, 2 Drawing Sheets

DRIVE UNIT FOR CONTINUOUS MEANS OF CONVEYANCE IN A CONTINUOUS TRANSFER SYSTEM

BACKGROUND OF THE INVENTION

The invention concerns a drive unit for a continuous conveyance means of a transfer system. A drive unit was made known in DE 195 32 391 C2, the housing of which is composed of a top housing part and a bottom housing part. Shoulders interconnected via a cover plate are formed on the top housing part that accommodate the bearing of a drive wheel. The shoulders are capable of being guided into matching cut-outs in the bottom housing part, and the top housing part is screwed together with the bottom housing part. The known drive unit is designed so that it can be located at the end of a conveyor line or integrated in a conveyor line. Although it is possible with the known drive unit to insert the drive wheel from the top into the line and/or the bottom housing part of the drive unit, the top housing part and the drive wheel must always be removed from the bottom housing part in order to perform maintenance work.

ADVANTAGES OF THE INVENTION

The drive unit according to the invention for a continuous conveyance means of a transfer system has the advantage that it allows for particularly easy installation and removal of the drive wheel and, simultaneously, the drive wheel need not be removed from the housing to perform maintenance work. Moreover, due to its construction, it is suited for use as a simple drive and turning station, as well as a drive station having a flange-mounted chain case housing. According to the invention, these objects are attained by means of a construction of the housing part that is open on the top and bottom end faces that can be closed with appropriate components.

Additional advantageous further developments of the drive unit according to the invention for a continuous conveyance means of a transfer system are indicated in the dependent claims.

BRIEF DESCRIPTION OF THE DRAWINGS

An exemplary embodiment of the invention is presented in the drawings and will be explained in greater detail hereinbelow.

DETAILED DESCRIPTION OF THE PREFERRED EMBODIMENTS

Figure 1:
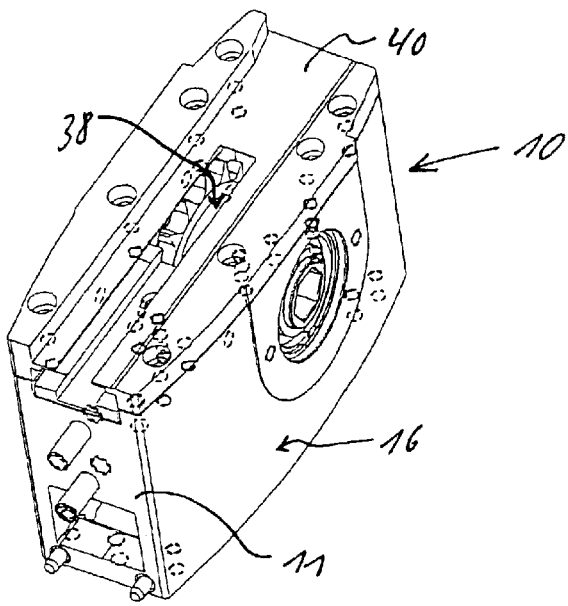
FIG. 1 is a perspective view of a drive unit according to the invention for a continuous conveyance means of a transfer system.
Figure 3:
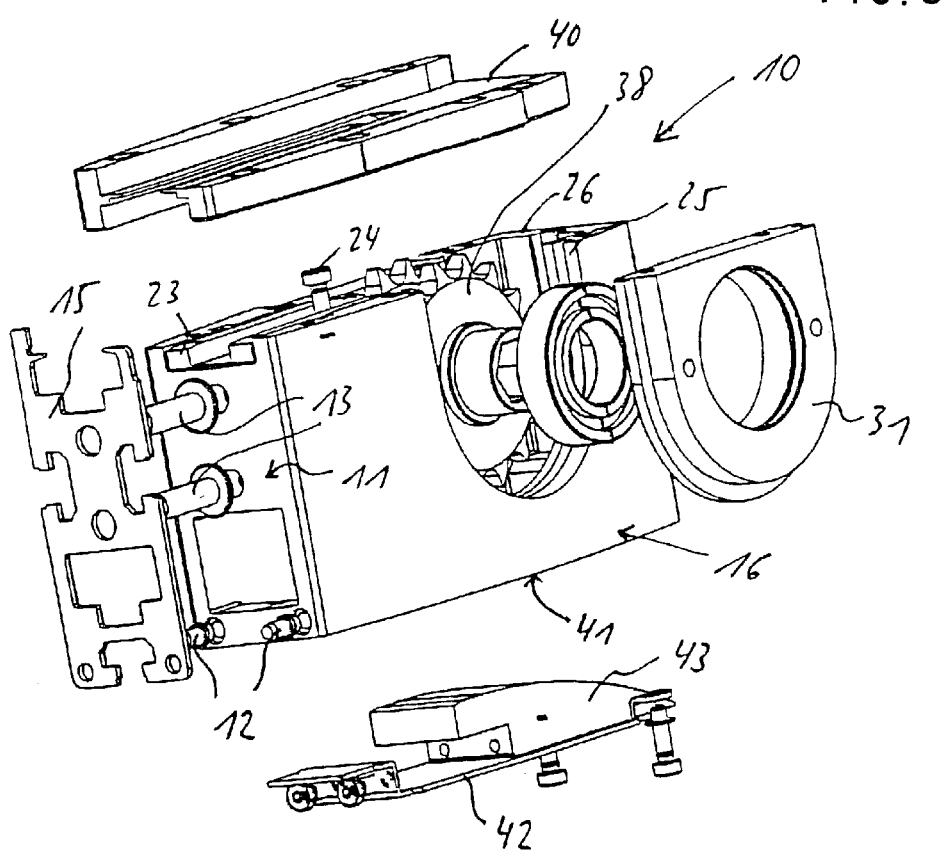
FIGS. 2 and 3 are perspective views as well of the individual parts of the drive unit in FIG. 1.
Figure 2:
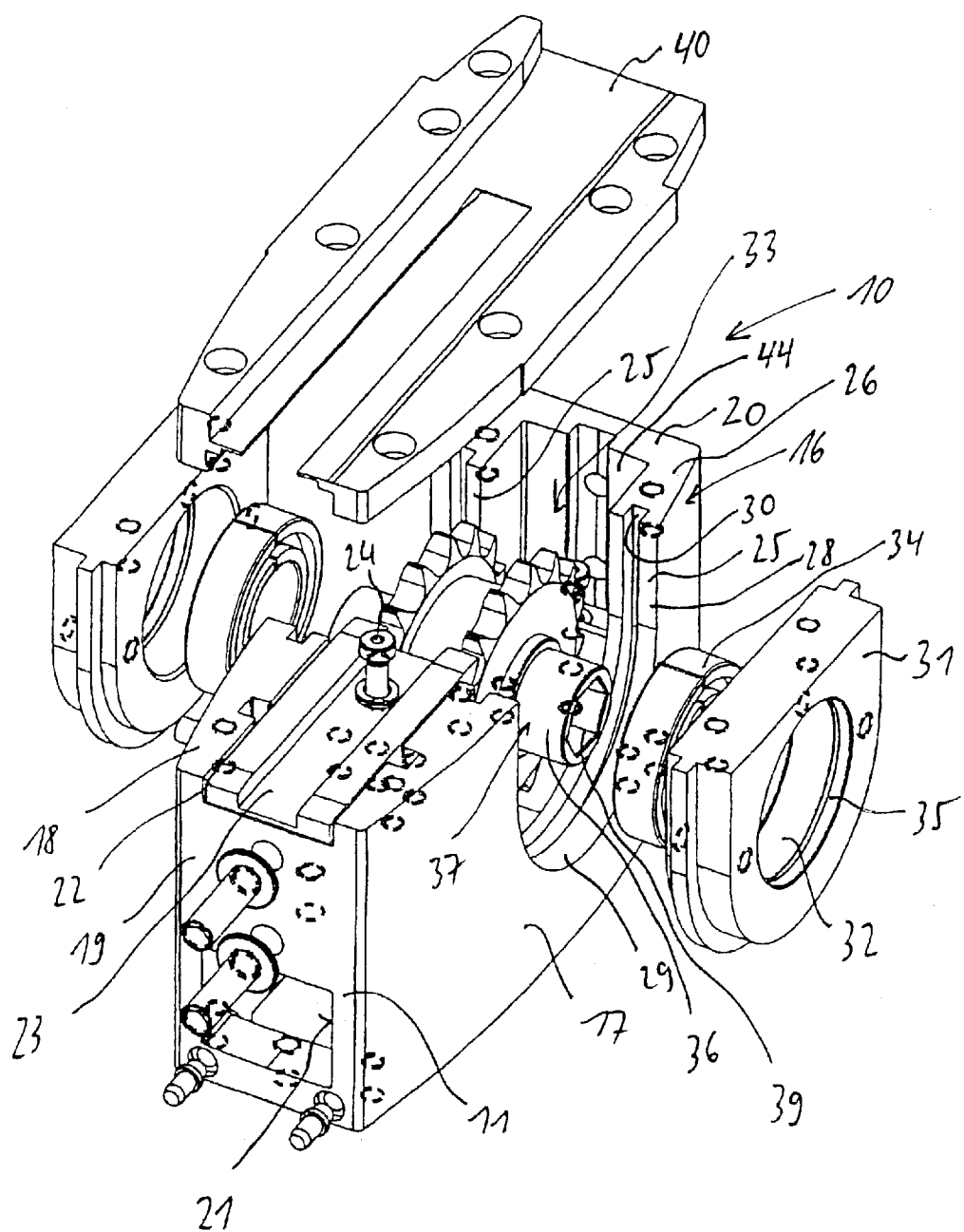

The drive unit 10—presented in the figures—for a continuous conveyance means, in particular a conveyor chain, is a component of a conveyor line of a transfer system. The drive unit 10—with a front end face 11 and connecting elements 12, 13 and with a stop plate (15) situated in-between (FIG. 3), if applicable—is capable of being interconnected with a profiled bar.

The drive unit 10 has a block-shaped, single-component housing part 16 with side walls 17, 18 domed on the outside of the housing part 16, a front housing wall 19 and a back housing wall 20. An opening is formed in the front housing wall 19 for guiding the conveyance means through into the return plane of the profiled bar. A recess 22 is formed on the top side 26 of the housing part 16 on the side facing the front housing wall 19, into which said recess a chain guide body 23 composed of plastic is located that is capable of being interconnected with the housing part 16 by means of a screw 24.

A recess 25 is formed in each of the two side walls 17, 18 of the housing part 16, whereby the two said recesses are aligned with each other. The recesses 25—which extend away from the top side 26 of the housing part 16 and are closer to the back housing wall 20 than to the front housing wall 19—each comprise a straight section 28 on the side closest to the top side 26, which said straight section is abutted by a semicircular section 29. Furthermore, a groove 30 is formed in the center of each recess 25. A bearing plate 31 is capable of being inserted in this groove 30 with positive engagement. The bearing plate 31 has a shouldered through hole 32, so that a bearing body 34 and a locking ring are capable of being pressed or inserted into the through hole 32 from the inside 33 of the housing part 16 in such a fashion that the collar 35 of the through hole 32 forms a stop for the bearing body 34.

The bearing bodies 34 serve to accommodate axle journals 36 of a drive shaft 37 on which a drive wheel 38 can be mounted in torsion-resistant fashion. The drive shaft 37 has a hexagon 39 that interacts via positive engagement with a journal of a not-shown drive motor. A recess 44 is formed in the back housing wall 20 to facilitate a torsion-proof insertion of screws/nuts between the drive wheel 38 and the back housing wall 20.

The top side 26 of the housing part 16 is capable of being closed by means of a cover plate 40 composed preferably of plastic. The cover plate 40 holds the bearing plates 31 tightly in their recesses 25. If it is necessary to combine a "chain tensioner" with the drive unit 10, its housing can be easily mounted on the bottom side 41 of the housing part 16. The fact that the inside 33 of the housing part 16 is open in the direction toward the bottom side 41 makes it possible for the conveyance means to be guided out of the housing part 16 in the direction of the chain case. If an additional tensioning device is not required, however, the bottom side 41 of the housing part 16 is closed with a bottom cover plate 42 shown in FIG. 3. This cover plate 42 has a guide body 43—composed of plastic—for the conveyance means, which said guide body guides and turns the conveyance means in the direction of the opening 21 in the front housing wall 19.

Due to the open construction of the housing part 16 on the top side 26 and the bottom side 41, the drive unit 10 described hereinabove makes it possible, on the one hand, to easily install the bearing plates 31 with bearing bodies 34 and drive shaft 37, including drive wheel 38—which represents a subassembly capable of being pre-assembled—and, on the other hand, it allows for universal use of the drive unit 10 with or without a chain case. The inside 33 of the housing part 16 can be accessed by removing the top cover plate 40 without having to remove any further drive parts from the housing part 16 and/or the drive unit 10.

What is claimed is:

1. A drive unit (10) for a a transfer system, comprising:
a continuous conveyance means;
a housing part (16) for accommodating a drive wheel (38), whereby the housing part (16) comprises two side walls (17, 18), a front wall (19) with an opening (21) for the continuous conveyance means, and a back wall (20), wherein said walls are interconnected with each other in the manner of a single component, whereby a top end face (26) and a bottom end face (41) of the housing part (16) are open, and wherein each side wall (17, 18) comprises a recess (25) into which a bearing plate (31) that accommodates a drive shaft (36) of the drive wheel (38) is capable of being inserted from a direction of the open top end faces (26, 41) of the housing part (16), wherein the recesses (25) are capable of being closed by means of a cover plate (40), and wherein the cover plate (40) is formed to be separate from the bearing plate (31).

2. The drive unit according to claim 1, wherein the recesses (25) extend away from the top end face (26) of the side wall (17, 18).

3. The drive unit according to claim 1, wherein the recesses (25) and/or the drive wheel (38) are situated offset toward the back wall (20).

4. The drive unit according to claim 1, wherein each of the recesses (25) comprises a groove (30) for accommodating the bearing plates (31) with positive engagement.

5. The drive unit according to claim 1, wherein the back wall (20) comprises a recess (44) designed in the shape of a groove.

6. The drive unit according to claim 1, wherein a base plate (42) having a guide element (43) for the conveyance means, or a chain vase, is capable of being fastened to the bottom, open end face (41) of the housing part (16).

7. The drive unit according to claim 1, wherein a subassembly—capable of being preassembled—composed, at the least, of the two bearing plates (31), the drive wheel (38) and its bearing (34) with drive shaft (37) is capable of being inserted in the recesses (25).

* * * * *